No. 788,435. Patented April 25, 1905.

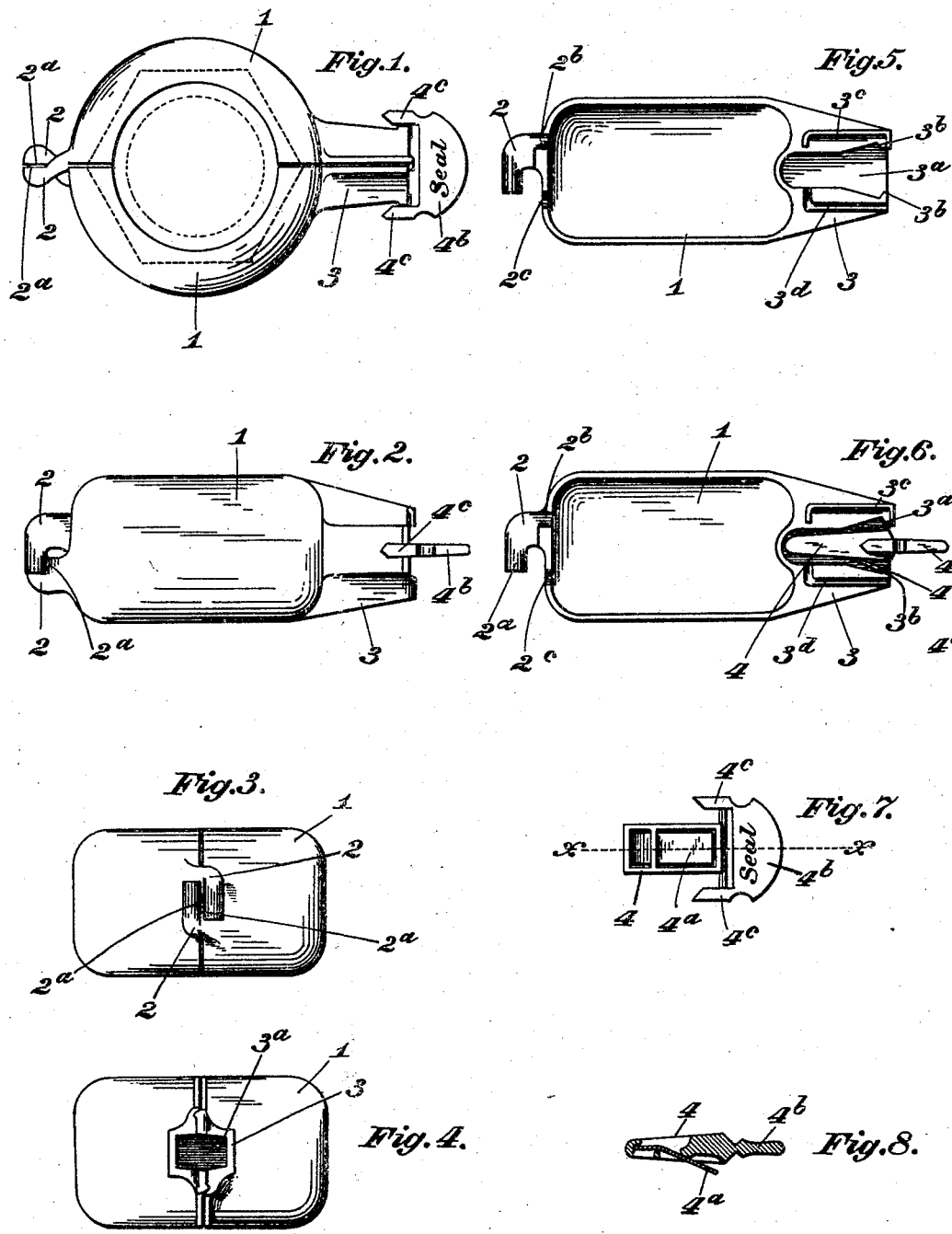

UNITED STATES PATENT OFFICE.

ROBERT DALE SIMPSON, OF COLUMBUS, OHIO, ASSIGNOR TO MICHAEL A. CORBETT, OF COLUMBUS, OHIO.

SEALING DEVICE FOR PIPE-COUPLINGS OR THE LIKE.

SPECIFICATION forming part of Letters Patent No. 788,435, dated April 25, 1905.

Application filed January 8, 1904. Serial No. 188,196.

*To all whom it may concern:*

Be it known that I, ROBERT DALE SIMPSON, a citizen of the United States, residing at Columbus, in the county of Franklin and State of Ohio, have invented certain new and useful Improvements in Sealing Devices for Pipe-Couplings or the Like; and I do hereby declare the following to be a full, clear, and exact description of the invention, such as will enable others skilled in the art to which it appertains to make and use the same.

The invention relates more especially to devices of the kind that are secured around the couplings of pipes where they enter meters to prevent unauthorized access to and manipulation of the couplings for the purpose of unlawfully appropriating the gas, water, or other supply flowing through the pipe.

The object of the invention is to simplify and improve the construction of such devices whereby they may be produced at small cost; and the invention consists, therefore, in the construction hereinafter described and claimed, the invention not being limited to the precise forms shown.

In the accompanying drawings, Figure 1 is a plan view of the device as it appears applied to a coupling, the outline of the coupling being indicated by broken lines. Fig. 2 is an edge view of the same. Fig. 3 is a view of the rear side. Fig. 4 is a view of the front end. Fig. 5 is a view of the inner side of one of the shells. Fig. 6 is a view of the same with the sealing device inserted in its socket. Fig. 7 is a plan view of the sealing device alone. Fig. 8 is a section on the line $x\ x$, Fig. 7.

Like characters of reference in the several views designate corresponding parts.

The body of the device is composed of two sections, each of which can be and preferably is shaped in all its parts like the other and, in fact, may, if desired, be cast or molded by the use of a single pattern. A description of one section will therefore suffice for both. The main body or portion 1 of each section is of the form of a semicircular concavo-convex shell having at one end a hook member 2 with a locking face or side $2^a$. This locking-face lies beyond the shell, but in the plane of its straight side. The edge of the shell at the base of the hook and at one side of the central horizontal plane of the shell is made with a projection $2^b$, and at a point equidistant from said horizontal plane is a notch $2^c$, conformable to the projection $2^b$. Projecting from the opposite end or the "front" end, as I shall hereinafter refer to it, is a web or neck portion 3, having a cavity $3^a$, at the outer end of which are formed shoulders $3^b$. On one side of the web beyond the cavity is a bead or boss $3^c$, consisting of a straight portion parallel to the cavity and portions at its ends extending inward toward the cavity, and on the other side of the cavity at a point equidistant from the central plane of the shell is a groove $3^d$, consisting of a straight portion parallel to the cavity, with a portion at its inner end extending inward toward the cavity. To place two of these shells together to form the device for inclosing the coupling, they are located edge to edge, with their concave sides facing each other and their hooks, together with their locking-faces $2^a$, contacting, as seen in Figs. 1, 2, and 3. In this position the projection $2^b$ of each shell enters the notch $2^c$ of the other, and assuming that the device is in a horizontal position and calling the hook end the "rear" end the hooks prevent separation of the shells at their rear ends in a horizontal direction, while the engagement of the projections $2^b$ with the notches $2^c$ prevent their separation at that end in a vertical direction. At the other end of the device—that is, at the front end—the inner portion of the boss or bead $3^c$ on each shell enters the groove or socket $3^d$ of the other, while the outer portion of the bead $3^c$ extends across and closes the line of division between the shells to the extent of their length at the outer extremity of the shells. The engagement of the aforesaid bead or boss and socket or groove prevents vertical separation of the shells at their front ends and at the same time prevents the insertion of an instrument between the sections for the purpose of manipulating the key or its spring. To prevent horizontal separation of the shells at their front ends, I provide a key or seal comprised of a buckle-like bolt 4, in which is secured a short piece of springsteel $4^a$, the free end of which normally projects laterally from the side of the bolt and toward the finger-piece $4^b$, which is cast with the bolt, said finger-piece having at its ends small ears $4^c$, projecting inward parallel to the buckle-shaped portion. When the bolt or spring-bearing portion of the key is shoved into the socket formed by the cavities $3^a$, the free end of the spring engages the adjacent shoulder $3^b$, and the ears $4^c$ embrace or oppose the outer sides of the webs 3, and so prevent horizontal separation of the shells at the front end of the device. The key or sealing device will be made to fit so closely in the socket formed by the cavities $3^a$ that no instrument can be inserted between it and the sections to lift the spring away from the shoulder $3^b$. I shall prefer to cast the finger-piece of the key to the bolt with a thin fragile connection, so that the finger-piece and the locking-ears $4^c$ may be easily broken off, after which the parts of the shell can be readily separated laterally to remove them from the coupling.

In practice the device shown is put together about the coupling to be protected in the way described and as indicated in Fig. 1. Because the shells can only be separated by breaking the seal this act when performed unauthorizedly will be a suspicious if not an altogether convincing circumstance in evidence where theft of the supply is charged or suspected.

In order that the key may not be easily counterfeited, it can bear the monogram or some sign or symbol of the person or corporation furnishing the commodity that is supplied through the pipe and meter.

I do not confine myself to the precise form of parts shown, because the scope of the invention is to be gathered from the claims.

What I claim, and desire to secure by Letters Patent, is—

1. In a sealing device for pipe-couplings and the like, a shell having a hooking member and a notch and a projection at the rear of the shell, and a bead and a recess at the front of the shell.

2. A sealing device for pipe-couplings and the like comprising two shells each composed of a shell portion proper having at its rear end a hooking member and a notch and a projection, and at its front end a bead and a recess and means for locking said shells together.

3. A sealing device for pipe-couplings and the like comprising two shells each composed of a shell portion proper having at its rear side a hooking member and a notch and a projection, and at its front side a bead and a recess, and separate breakable means for locking said shells together.

4. A sealing device for pipe-couplings and the like comprising two correspondingly-shaped separable shells having corresponding devices for latching them from separation at their rear sides when placed together, and a separate breakable key for engaging and locking the front sides together and thereby locking the rear sides together.

5. A sealing device for pipe-couplings and the like comprising two correspondingly-shaped separable shells constructed so that when placed together they are latched from separation horizontally and vertically at their rear sides and latched from separation vertically at their front sides, and a key adapted to embrace the outer portion of such shells and lock the same from separation in any direction at both sides.

6. A sealing device for pipe-couplings and the like composed of correspondingly-shaped shells having hooking members at their rear sides and matching projections and recesses at their front sides, and a separate device for engaging both shells to lock the same from separation in any direction.

7. A sealing device for pipe-couplings and the like composed of correspondingly-shaped shells having hooking members at their rear sides, and matching projections and recesses and a socket for the reception of a locking-key at their front sides and projections to cover the line of separation between the shells adjacent the aforesaid socket, and a key constructed to enter and engage said socket and lock the shells from separation in any direction.

8. A sealing device for pipe-couplings and the like comprising two shells with means for latching them together, and a key having ears adapted to engage and lock both shells and a tongue to be automatically locked thereto.

9. A sealing device for pipe-couplings and the like, comprising two shells with means for latching them together at their rear ends, and a separate key adapted to be applied directly to the shells after they are placed together to engage and lock them against lateral separation at their front ends and be simultaneously automatically locked thereto.

10. A sealing device for pipe-couplings and the like comprising two correspondingly-formed shells having means for latching them together at their rear ends, and a key adapted to engage and lock both shells together at their front ends and be locked thereto.

11. A sealing device for pipe-couplings and the like composed of correspondingly-shaped shells having hooking members at their rear sides, arms on the front sides of said shells, one of said arms having a projection engaging the other arm to prevent lateral movement, and a separate device for engaging both shells to lock the same from separation in any direction.

In testimony whereof I affix my signature in presence of two witnesses.

ROBERT DALE SIMPSON.

Witnesses:
GEORGE M. FINCKEL,
SAMUEL W. LATHAM.